(12) United States Patent
Prasad et al.

(10) Patent No.: US 10,235,223 B2
(45) Date of Patent: Mar. 19, 2019

(54) HIGH-PERFORMANCE COMPUTING FRAMEWORK FOR CLOUD COMPUTING ENVIRONMENTS

(71) Applicant: Georgia State University Research Foundation, Inc., Atlanta, GA (US)

(72) Inventors: Sushil K. Prasad, Suwanee, GA (US); Sara Karamati, Atlanta, GA (US); Dinesh Agarwal, Atlanta, GA (US)

(73) Assignee: Georgia State University Research Foundation, Inc., Atlanta, GA (US)

( * ) Notice: Subject to any disclaimer, the term of this patent is extended or adjusted under 35 U.S.C. 154(b) by 4 days.

(21) Appl. No.: 15/312,211

(22) PCT Filed: May 20, 2015

(86) PCT No.: PCT/US2015/031762
§ 371 (c)(1),
(2) Date: Nov. 18, 2016

(87) PCT Pub. No.: WO2015/179509
PCT Pub. Date: Nov. 26, 2015

(65) Prior Publication Data
US 2017/0083387 A1 Mar. 23, 2017

Related U.S. Application Data

(60) Provisional application No. 62/001,128, filed on May 21, 2014.

(51) Int. Cl.
*G06F 9/54* (2006.01)
*G06F 9/455* (2018.01)

(52) U.S. Cl.
CPC .......... *G06F 9/546* (2013.01); *G06F 9/45504* (2013.01); *G06F 2009/45595* (2013.01)

(58) Field of Classification Search
CPC .............. G06F 9/546; G06F 9/45504; G06F 2009/45595
See application file for complete search history.

(56) References Cited

U.S. PATENT DOCUMENTS

| | | | |
|---|---|---|---|
| 8,805,951 B1* | 8/2014 | Faibish | G06F 9/5072 709/213 |
| 2005/0149612 A1* | 7/2005 | Messinger | G06F 9/5038 709/200 |

(Continued)

OTHER PUBLICATIONS

International Search Report for PCT/US2015/031762 dated Aug. 14, 2015.

*Primary Examiner* — Charles E Anya
(74) *Attorney, Agent, or Firm* — Thomas | Horstemeyer, LLP

(57) ABSTRACT

Disclosed are various embodiments for a high-performance computing framework for cloud computing environments. A parallel computing application executable by at least one computing device of the cloud computing environment can call a message passing interface (MPI) to cause a first one of a plurality of virtual machines (VMs) of a cloud computing environment to store a message in a queue storage of the cloud computing environment, wherein a second one of the plurality of virtual machines (VMs) is configured to poll the queue storage of the cloud computing environment to access the message and perform a processing of data associated with the message. The parallel computing application can call the message passing interface (MPI) to access a result of the processing of the data from the queue storage, the result of the processing being placed in the queue storage by the second one of the plurality of virtual machines (VMs).

20 Claims, 14 Drawing Sheets

(56) References Cited

U.S. PATENT DOCUMENTS

| | | | |
|---|---|---|---|
| 2006/0271931 A1* | 11/2006 | Harris | G06F 9/52 718/1 |
| 2008/0114842 A1* | 5/2008 | Ellis | H04L 51/18 709/206 |
| 2008/0320194 A1* | 12/2008 | Vega | G06F 9/4812 710/263 |
| 2009/0006621 A1* | 1/2009 | Ellis | G06F 9/52 709/225 |
| 2012/0072758 A1* | 3/2012 | Shafi | G06F 9/5011 713/400 |
| 2012/0102572 A1 | 4/2012 | Murakami et al. | |
| 2012/0204030 A1 | 8/2012 | Nossik et al. | |
| 2012/0303667 A1* | 11/2012 | Madhavarapu | G06F 17/30286 707/791 |
| 2012/0303670 A1* | 11/2012 | Gillen | G06F 9/5072 707/797 |
| 2013/0246533 A1 | 9/2013 | Archer et al. | |
| 2013/0318102 A1 | 11/2013 | Fontignie et al. | |
| 2013/0326639 A1 | 12/2013 | Droste et al. | |
| 2014/0032850 A1 | 1/2014 | Phelan et al. | |
| 2014/0282889 A1* | 9/2014 | Ishaya | H04L 63/08 726/4 |

* cited by examiner

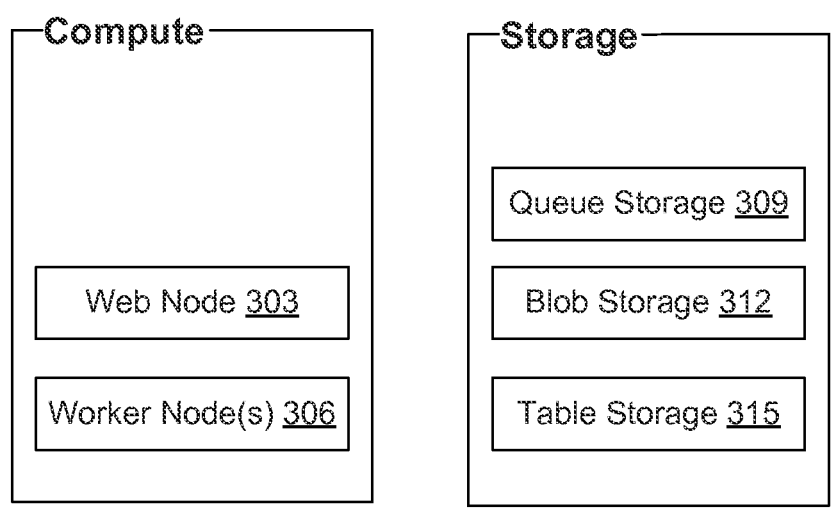
FIG. 3

```
C Language – Blocking Message Passing Routines Example
```
```
int numtasks, rank;
int sendBuf[4]={1, 2, 3, 4};
int recvBuf[4];

MPI_Init (&argc,&argv);
MPI_Comm_size(MPI_COMM_WORLD, &numtasks);
MPI_Comm_rank(MPI_COMM_WORLD, &rank);

if (rank == 0) {
    MPI_Send(sendBuf, 4, MPI_INT, 1, 1, MPI_COMM_WORLD);
} else if (rank == 1) {
    MPI_Recv(recvBuf, 4, MPI_INT, 0, 1, MPI_COMM_WORLD, &Stat);
}
MPI_Finalize();
```

```
Message Passing Service Language – Blocking Message Passing Routines Example
```
```
int numtasks, rank;
int sendBuf = new int{1, 2, 3, 4};
int recvBuf = new int[4];

cMPI.Init(connectionString);
cMPI.Comm_size(cMPI_COMM_WORLD, out numtasks);
cMPI_Comm_rank(cMPI_COMM_WORLD, out rank);

if (rank == 0) {
    cMPI.Send(sendBuf, 0, 4, MPI_INT, 1, 1, cMPI.COMM_WORLD);
} else if (rank == 1) {
    cMPI.Recv(ref recvBuf, 4, MPI_INT, 0, 1, cMPI.COMM_WORLD);
}
cMPI.Finalize();
```

FIG. 4

HIGH-PERFORMANCE COMPUTING FRAMEWORK FOR CLOUD COMPUTING ENVIRONMENTS

CROSS-REFERENCE TO RELATED APPLICATION

This application is a 35 U.S.C. § 371 national stage application of PCT Application No. PCT/US2015/031762, entitled "HIGH-PERFORMANCE COMPUTING FRAMEWORK FOR CLOUD COMPUTING ENVIRONMENTS," filed May 20, 2015, which claims the benefit of and priority to U.S. Provisional Patent Application No. 62/001,128, entitled "HIGH-PERFORMANCE COMPUTING FRAMEWORK FOR CLOUD COMPUTING PLATFORMS," filed on May 21, 2014, the contents of both being hereby incorporated by reference in their entirety herein.

BACKGROUND

The Message Passing Interface (MPI) comprises a communications protocol for communicating between parallel and distributed computing processes. MPI supports both point-to-point and collective communication. MPI comprises a library of subroutines that can be imbedded in source code by a programmer to control parallelism in parallel computing frameworks.

Traditionally, a cloud computing environment comprises one or more machine instances (whether virtual or physical) that are capable of distributing processing over a network of computing devices. For example, portions of a single application may run on the one or more machine instances at the same time. The communication network traditionally comprises the Internet, an intranet, a local area network (LAN), or a wide area network (WAN).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a drawing illustrating programming artifacts of an example cloud computing environment of FIG. 2 according to various embodiments of the present disclosure.

FIG. 4 is a table comparing code of the cloud-based message passing interface of FIG. 2 compared to traditional MPI code according to various embodiments of the present disclosure.

DETAILED DESCRIPTION

Figure 1:
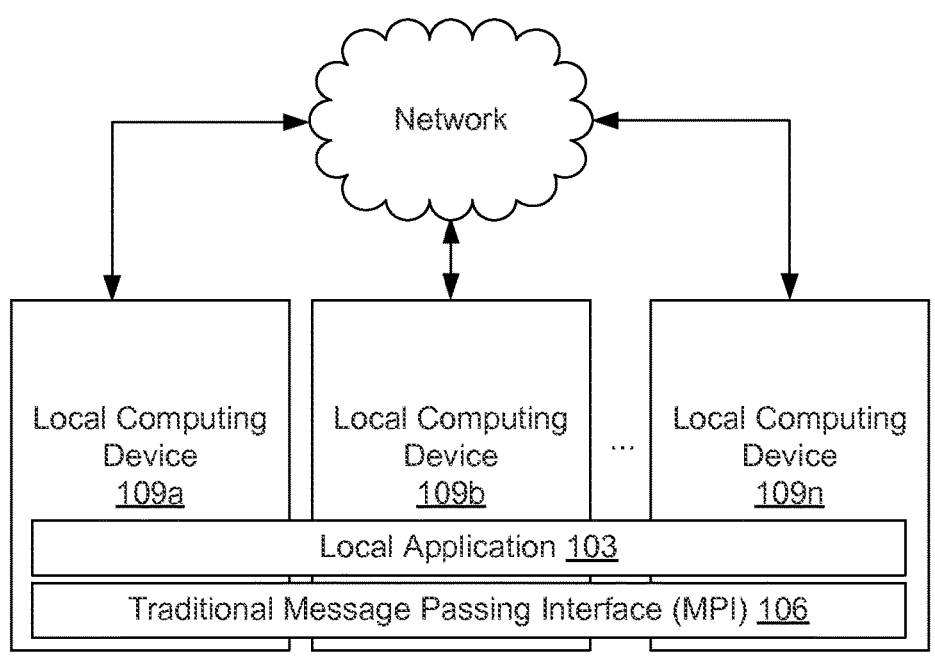
FIG. 1 is a drawing of a system comprising a message passing interface for a local computing environment according to various embodiments of the present disclosure.

The present disclosure relates to a high-performance message passing interface for cloud computing environments. As discussed above, MPI comprises a communications protocol for communicating between parallel and distributed computing processes. MPI supports both point-to-point and collective communication. MPI comprises a library of subroutines that can be imbedded in source code by a programmer to control parallelism in parallel computing frameworks.

As may be appreciated, cloud computing environment traditionally comprise low-latency and high-bandwidth network capabilities. However, cloud computing environments have inherent architectural differences from traditional computing clusters. The advent of cloud computing has provided computing environments with unprecedented scale, yet its adoption has been limited by a difficulty in employing cloud based resources. Cloud computing environment have not been seen as a viable resource that can replace traditional computing environments. For example, advanced parallel programming skills are not easily applicable to the cloud computing environments as many cloud computing environments are proprietary and have unique language constructs. Although infrastructure as a service (IaaS) allows customized software installations, IaaS cannot demonstrate network capabilities of a traditional cluster.

According to various embodiments of the present disclosure, a message passing interface similar to MPI may be implemented in a cloud computing environment. The message passing interface facilitates access to a large class of applications that run for long time spans with varying computing needs, such as a modeling and analysis to predict a swath of a hurricane. Such applications could benefit from the resiliency and on-demand access of cloud computing environments.

Thus, according to various embodiments, a system as described herein comprises a cloud computing environment offering a plurality of resources over a network via an application programming interface (API) and a message passing interface executable in at least one computing device comprising a local queue for each instance of a virtual machine (VM) in the cloud computing environment. The message passing interface may comprise logic or code that accesses a software routine in an application defined according to a first format of the message passing interface; translates the software routine from the first format of the message passing interface to a second format of the API; stores the translated software routine in the second format of the API in the local queue; and sends the translated software routine in the local queue to perform the software routines on the cloud computing environment.

In order to transition an MPI library to a cloud-based messaging framework, it is beneficial to have the underlying cloud architecture mimic the resource organization of a traditional cluster. For example, in a traditional MPI implementation, each compute node has a multiprocessing daemon (MPD) running in the background. The MPDs communicate and form a virtual machine before an application starts executing. From a high-level view, each MPD appears to behave as local resource manager for an entire node. The MPI requests from application programs are handled by local MPDs and forwarded to destination MPDs to be delivered to target MPI processes.

The core functional infrastructure of a typical MPI environment can be dialed down to a few MPI primitives, such as, MPI_init, MPI_comm_size, MPI_comm_rank, MPI_send, MPI_recv, and MPI_finalize. All MPI implementations can support these primitives. MPI_init initializes a communication environment, also called MPI_Comm_World, which specifies a subset (group) of nodes that partake in the execution of the MPI code.

MPI_comm_size returns the number of compute nodes in the current environment. This primitive is typically used to formalize the dynamic distribution and allocation of tasks among available compute nodes. MPI_comm_rank returns the identifier of the calling node. Since copies of the same code run on all nodes, it is essential for nodes to be able to know their own ids to choose and execute portions of the code. For instance, a program where nodes are arranged hierarchically in a binary tree fashion, and the operation is active only at a selected subset of nodes at any given time, nodes need to know their identifiers to algorithmically decide when to stay active. The MPI_send and MPI_recv primitives are used to communicate via messages. The data sent over messages may be stored in a buffer locally (on the sending side) where it is encapsulated into packets that are transmitted over the network. The receiving end may behave traditionally when receiving messages. There are a few variations of these primitives based on how the buffers are handled. MPI_finalize_primitive is the last MPI call as it releases all of the resources occupied by the MPI program.

The steep learning curve faced by developers who previously wanted to write applications for cloud computing environments had a lot to do with the interfaces provided by cloud computing vendors. For example the nomenclature and accessibility typically requires abstraction to reduce complexity and to allow developers to seamlessly work with the cloud computing environments.

According to various embodiments, a terminal based interactive shell can be employed to provide easy-to-use bindings that provide developers with a way of administering basic configurations of a project. The terminal shell can connect to an account of a developer on the cloud computing environment by prompting the user for their configuration settings at a first launch. The terminal can further execute commands on the cloud computing environment.

Another significant difference between traditional MPI clusters and a cloud computing environment is in the compute nodes. Typically, each cloud role can have multiple instances and the instances for each machine type are assigned an identifier starting at 0. Unfortunately, there are no straightforward APIs that can determine the type of the role (web or worker) where a particular code is running. Thus, sending a message to the node with identifier 0 does not accurately specify whether the message is meant for the web role or the worker role.

The MPI APIs intended to use on the cloud computing environment may be similar to traditional MPI in order to reduce the cost of porting. However, C# and PHP, which are the default implementation languages for various cloud computing environments, along with the configuration of cloud computing roles, brings up some implementation challenges. For example, in traditional MPI, pointers to initial address of the send/receive buffer are passed to MPI functions. However, C# or PHP do not encourage using pointer arithmetic due to type safety and security concerns. This may cause a problem as pointer arithmetic is required to reference the first element of the send/receive buffer.

Accordingly, it is beneficial to implement a message passing interface comprising logic or code that accesses a software routine in an application defined according to a first format of the message passing interface; translates the software routine from the first format of the message passing interface to a second format of the API; stores the translated software routine in the second format of the API in the local queue; and sends the translated software routine in the local queue to perform the software routines on the cloud computing environment. In the following discussion, a general description of the system and its components is provided, followed by a discussion of the operation of the same.

FIG. 1 is a drawing of a system comprising a message passing interface for a local computing environment according to various embodiments of the present disclosure. As shown in FIG. 1, a local application 103 utilizes application programming interface (API) calls to a traditional message passing interface 106 to perform parallel computing operations on a plurality of local computing devices 109a . . . 109n (collectively local computing device 109). The local computing devices 109 can communicate message over the network, which may include a data bus.

Figure 2:
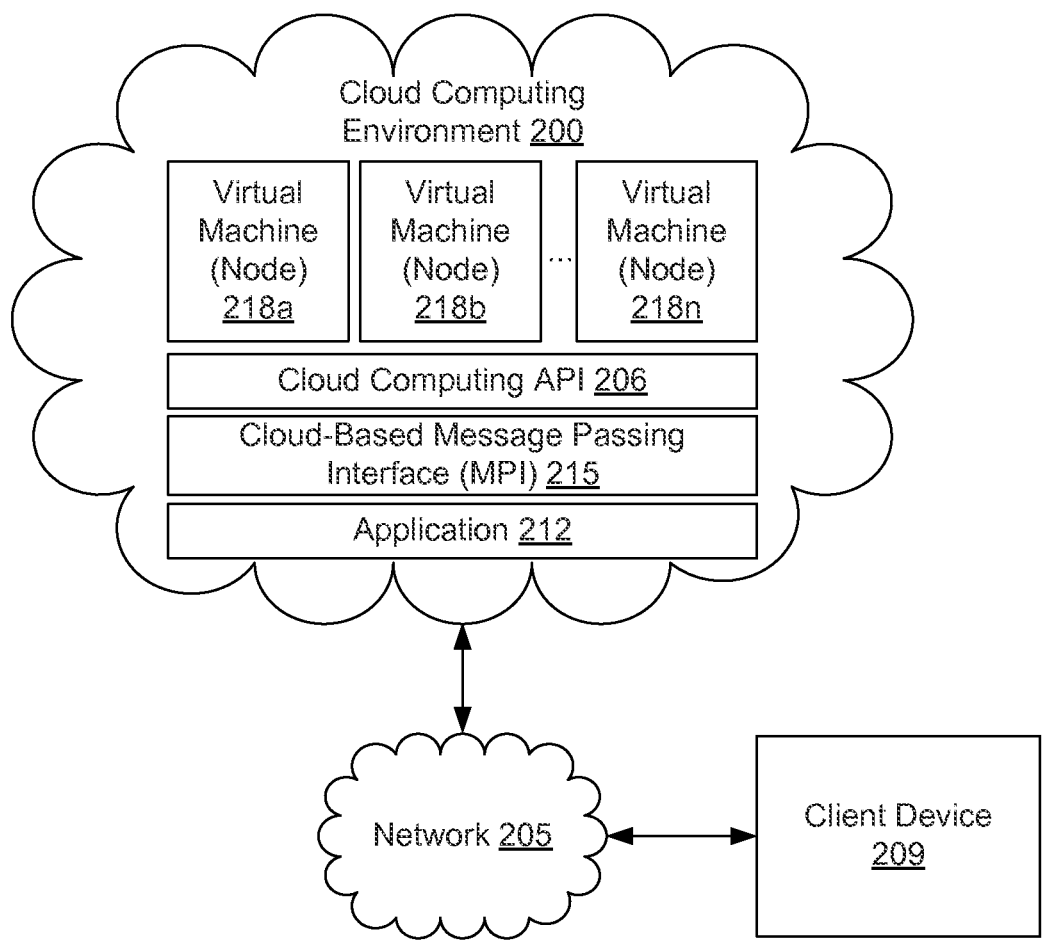
FIG. 2 is a drawing of a system comprising a cloud-based message passing interface for a cloud computing environment according to various embodiments of the present disclosure.

Shown in FIG. 2, a system comprises a cloud computing environment 200 offering computing resources over a network 205 via a cloud computing application programming interface (API) 206. Traditionally, a client device 209 performs API calls to the cloud computing API 206 to perform functions in the cloud computing environment 200. However, an application 212, such as a parallel computing application, can be implemented to perform high-performance and/or parallel computing operations in the cloud computing environment 200 using a cloud-based message passing interface (MPI) 215.

The client device 209 and the cloud computing environment 200 are in data communication with each other via a network 205 The network 205 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The client device 209 is representative of a plurality of client devices that may be coupled to the network 205. The client device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 209 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 209 may be configured to execute various applications such as a client application and/or other applications. The client application may be executed in a client device 209, for example, to access network content served up by the cloud computing environment 200 and/or other servers, thereby rendering a user interface on the display. To this end, the client application may comprise, for example, a browser, a dedicated application, etc., and the user interface may comprise a network page, an application screen, etc. The client device 209 may be configured to execute applications beyond the client application such as, for example, email applications, social networking applications, word processors, spreadsheets, and/or other applications.

The cloud computing environment 200 can include one or more virtual machines 218 . . . 218n (also referred to as virtual instances or nodes) to perform parallel computing operations. Although being described as a virtual machine 218, it is understood that execution is ultimately performed by a hardware computing device comprising processing circuitry, such as a hardware processor. To this end, the cloud computing environment 200 may comprise, for example, a server computer or any other system providing computing capability. Alternatively, the cloud computing environment 200 may employ a plurality of computing devices that may be arranged, for example, in one or more server banks or computer banks or other arrangements. Such computing devices may be located in a single installation or may be distributed among many different geographical locations. For example, the cloud computing environment 200 may include a plurality of computing devices that together may comprise a hosted computing resource, a grid computing resource and/or any other distributed computing arrangement. In some cases, the cloud computing environment 200 may correspond to an elastic computing resource where the allotted capacity of processing, network, storage, or other computing-related resources may vary over time.

As may be appreciated, the cloud-based message passing interface 215 may comprise a plurality of routines, functions, or API calls that may be accessed by a developer in a development of the application 212. According to various embodiments, the cloud-based message passing interface 215 may comprise a cMPI_init routine, a cMPI_comm_size routine, a cMPI_comm_rank routine, a cMPI_finalize routine, a cMPI_send routine, and a cMPI_recv routine, and/or other routines as may be appreciated.

The cMPI_init routine may set up all of the queues that will be required for communication. As a non-limiting example, at least one queue may be created for each node, wherein the at least one queue may be used to receive messages from other nodes. The at least one queue can be seen as local buffers from an MPI setting. Moreover, a single shared queue may be established to behave as the synchronization barrier. The cMPI_init routine may also create a table that will be used to map allocated node identifiers for the cloud computing environment 200 to traditional MPI node identifiers that are incrementally numbered.

Finally, the cMPI_init routine clears all of the queues to remove any leftover or unprocessed messages from earlier (abnormally terminated) runs. The cMPI_comm_size routine returns the number of nodes in the current communicator. By default it includes all of the nodes available in the cloud computing environment 200 deployment. However, all of the nodes are not needed. A cMPI API can be provided to developers that allows creation of a custom communicator with a subset of nodes available to the deployment.

The cMPI_comm_rank routine returns the identifier of a node or virtual machine 218. This may be achieved with an implementation where table storage can be used during cMPI_init routine to create a map from cloud computing environment 200 allocated identifiers (names) to incrementally numbered identifiers. The cMPI_finalize routine deletes all of the queues created by the program. If any message was stored in the cloud computing storage, those messages are deleted. Moreover, as transactions happen in the cloud computing environment 200, logs may be written automatically.

The cMPI_finalize routine cleans the log table as well. The cMPI_send and the cMPI_recv routines may work the same way with respect to their respective MPI counterparts. The point-to-point communication is the most commonly used communication pattern in MPI. There are two categories for MPI point-to-point communications: blocking and non-blocking. These categories provide a number of communication modes such as synchronous (MPI_Ssend, MPI_Issend), buffered (MPI_Bsend, MPI_Ibsend), ready (MPI_Rsend, MPI_Irsend), and standard (MPI_Send, MPI_Isend). Each communication mode employs different mechanisms to send messages to target nodes while offering trade-offs for synchronization overhead, system overhead, buffer space, and reliability.

According to various embodiments, existing MPI applications may be converted to applications ready to run on a cloud computing environment 200. For example, the cloud-based message passing interface 215 described herein may be configured to run pre-written MPI code (e.g., in the C or C++ programming languages) after utilizing a translator to convert such codes into equivalent cloud-based message passing interface 215 code written for the cloud computing environment 200 (e.g., in the C# programming language).

According to various embodiments, the translator may analyze the software (code) in a first format (e.g., C or C++) and convert it into a second format (e.g., C#). The translator may further analyze global and local memory mappings and store relevant data into a storage of the cloud computing environment 200. Automatic translation from C# with embedded MPI primitive invocation may be automatically translated to equivalent cloud-based message passing interface 215 primitives. The second format, (e.g., C#) with embedded cloud-based message passing interface 215 primitives, yields C# code with library implementations of the cloud-based message passing interface 215 primitives and can be executed on a cloud computing environment 200 with the MPI process and communication management.

According to various embodiments, each MPI process is mapped to a worker node in the cloud computing environment 200. Each node may have a personal queue as well as a global queue shared among the workers of the cloud computing environment 200. Data transmission primarily takes place over the queues. Data that is local to an MPI process is stored in a queue for respective cloud node's personal queue and data that is shared across processes is stored in a global queue. The data could be both input and output.

A fault tolerance mechanism of the cloud computing environment 200 can be leveraged whereby a message appears in a queue if a node has not confirmed successful processing of that message. This can be accomplished for every message that involves an MPI operation. For example, if a node X sends a message to a node Y, then node Y will read the message, process it, and delete the message from its local queue. However, if node Y fails before deleting the message, the message will reappear in the queue and the worker will process the message when the node comes is restored.

In various embodiments, local data is stored outside the worker's memory so that the data is not lost during the event of a failure. This is accomplished by storing the data at a public storage (e.g., such as another queue) or in cloud computing storage for a larger data size. A checkpoint is also needed to avoid any "dirty" reads or writes if a node fails after storing the data in the public storage but before deleting the message. Such a local checkpoint is needed before and after each local communication.

FIG. 3 is a drawing illustrating programming artifacts of the cloud computing environment 200 of FIG. 2 according to various embodiments of the present disclosure. More specifically, FIG. 3 shows the artifacts of the Windows Azure® platform. The Windows Azure® cloud platform is hosted in Microsoft® data centers. Azure® primarily consists of computing services, such as nodes or virtual machines (VMs), divided into web nodes 303 and worker nodes 306. Further, Azure® consistent of storage services offered as queue storage 309, blob storage 312, and table storage 315. The web node 303 can have a web server installed thereon and, as a result, can act as the user-facing component by providing network pages accessible by a client device. The worker nodes 306 traditionally do not have web server and are for background or batch processing, or other data processing. In a configuration according to various embodiments, tasks are assigned to the worker nodes 306 by the web node 303 using one or more of the storage services.

In various embodiments, the queue storage 309 is primarily used for communication among virtual machine (VM) instances. The queue storage 309 can also be tailored for the cloud computing environment 200. For example, every message in a queue can have a visibility timeout therein. If a message is not consumed within this timeout period, it is removed from the queue storage 309. Moreover, if a message is read from the queue storage 309 and within the visibility period, it can be determined whether the message was processed successfully. Assuming that the reading virtual machine (VM) failed, the message can reappear in the queue storage for access by other worker nodes 306.

On various cloud computing platforms, the queue storage 309 does not guarantee a first-in-first-out (FIFO) order of the messages and workarounds must be devised for applications that need ordering of messages. Blob storage 312 is similar to traditional file systems. A storage account can have multiple blob containers. For example, each blob container can contain multiple blobs and a blob could store any type of data similar to a file. There are two types of blobs, page blob and block blobs. Page blobs allow reading or writing from random locations. Block blobs are made up of smaller blocks and allow up to 4 MB sized blocks, or other predefined sized bocks, to be added to the blob storage.

The table storage offers a semi-structured storage service for data. Unlike traditional relational database systems, a table need not have a fixed schema. Each row can have its own schema as long as the total number of columns does not exceed 255, or other number predefined by the cloud computing environment 200. Every row can be identified using a combination of a partition key and a row key.

FIG. 4 is a table comparing code of the cloud-based message passing interface 215 of FIG. 2 compared to traditional MPI code according to various embodiments of the present disclosure. For purposes of illustration, function calls implemented in the cloud-based message passing interface 215 are referred to a "cloudMPI" or "cMPI" although the performance of the various functions of the cloud-based message passing interface 215 as described herein may be implemented in other languages, constructs, classes, or services.

In various embodiments, the cloud-based message passing interface 215 can be based on object-oriented principles consisting of the following classes: cMPI; cMPI Message; Datatype; and Comm. These classes, collectively, implement basic MPI routines in the cloud computing environment 200.

The cMPI class offers the methods to facilitate the communication among MPI nodes, or virtual nodes in the cloud computing environment 200. In some embodiments, all members of this class are declared static. The cMPI Message class packs data to be transferred in a message as well as the other attributes of a message that can be used to distinguish messages at a receiver instance. In various embodiments, a message includes the following fields: data; source; tag; msgId; and isSmallMessageField. The isSmallMessage field is used by the program to determine the location of the data (e.g., whether the data is in the message itself or is located in a queue or a blob).

For large messages (e.g., messages above 64 kB) this field is set to false. The msgId stored in this message is used for large messages and contains the location of the data in the blob, if applicable. The class Datatype contains the type information of the data elements of the array which is to be sent and received in cMPI communication operations. In order to provide seamless operation with traditional MPI routines, standard MPI data types can be employed, as shown in FIG. 3. If multiple communicators are required, one queue per node for each communicator can be established. Communicators can be perceived as communication channels. Benchmarking results show that using multiple queues offer better performance than using a single queue. Moreover, having multiple channels could be used to maintain the order of the messages. Default COMM WORLD communicator is defined as a static member in cMPI class.

The basic point-to-point communication operations implemented in cMPI class can be described as send and receive methods. These methods can be declared as follows: int Send(Object buffer, int offset, int count, Datatype type, int dest, int tag, cMPI Comm MPI COMM); and int Recv(ref object buffer, int offset, int count, Datatype type, int source, int tag, cMPI Comm MPI COMM). The arguments of these methods closely correspond to conventional MPI send and receive routines except for an additional offset parameter. Unlike the traditional MPI which uses pointers to specify buffer index, the cloudMPI methods get additional offset arguments to indicate the data position in the buffer. The buffer wraps the data, which is to be sent, in a generic object type. The buffer can be an array of any serializable objects. The type of the data wrapped by this object can be consistent with the type argument, which is one of the required arguments in Send/Recv methods. As shown in FIG. 4, a cloud-based MPI API can be created that is very similar to the C bindings of the conventional MPI. The cMPI.Init function initializes a channel of communication and assigns a list of nodes to this channel. One queue, dedicated to this channel, is created per node after the initialization. The need to allocate nodes to a channel allows users to broadcast a message to all of the nodes in a communicator. This routine gets Azure storage string as input which contains the necessary parameters required to access developer storage account in the Windows Azure® cloud computing environment 200. The receive buffer can be defined as object data type as shown in FIG. 4. The cMPI.Finalize function is used to release the resources occupied by the application.

Figure 5:
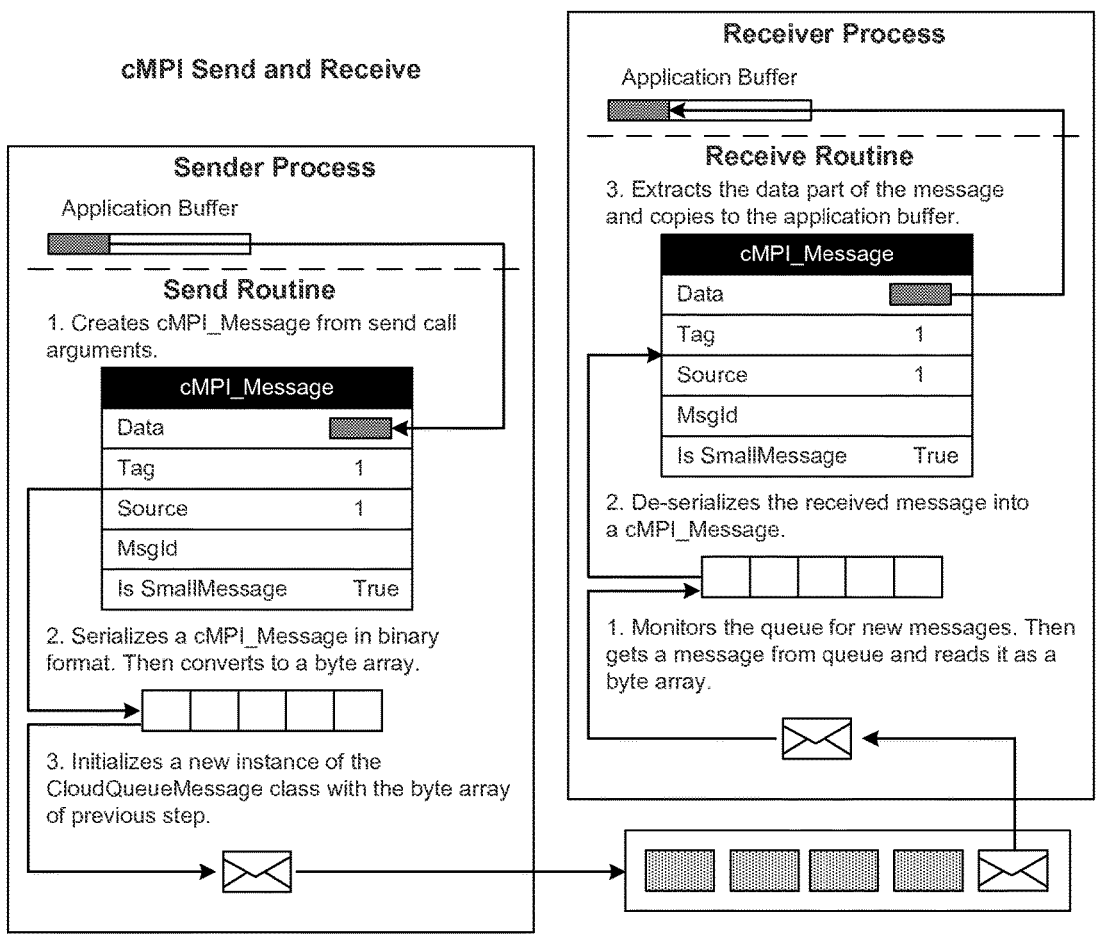
FIG. 5 is a drawing of a send and receive mechanism embodied in the cloud-based message passing interface via the cloud computing environment of FIG. 2 according to various embodiments of the present disclosure.

FIG. 5 is a drawing of a send and receive mechanism embodied in the cloud-based message passing interface 215 of FIG. 2 via the cloud computing environment 200 of FIG. 2 according to various embodiments of the present disclosure. More specifically, FIG. 4 shows an example of a send and receive mechanism between a sender instance and a receiver instance. The send routine packs data to be transferred, as well as the other attributes, in a message (e.g., cMPI message). These attributes can be used to distinguish messages at the receiver instance. Next, the message is serialized to a binary format and converted to a byte array as some cloud computing environments 200 (e.g., Microsoft Azure®) queues can store messages of a string type or byte array type. Finally a data object (e.g., CloudQueueMessage) is created from the byte array and sent to receiver instance queue. The receiver routinely monitors its queue for new messages. When received, a new message is deserialized to a data object, for example, of type cMPI Message. Then the receiver instance can retrieve required information from the received message.

Figure 6:
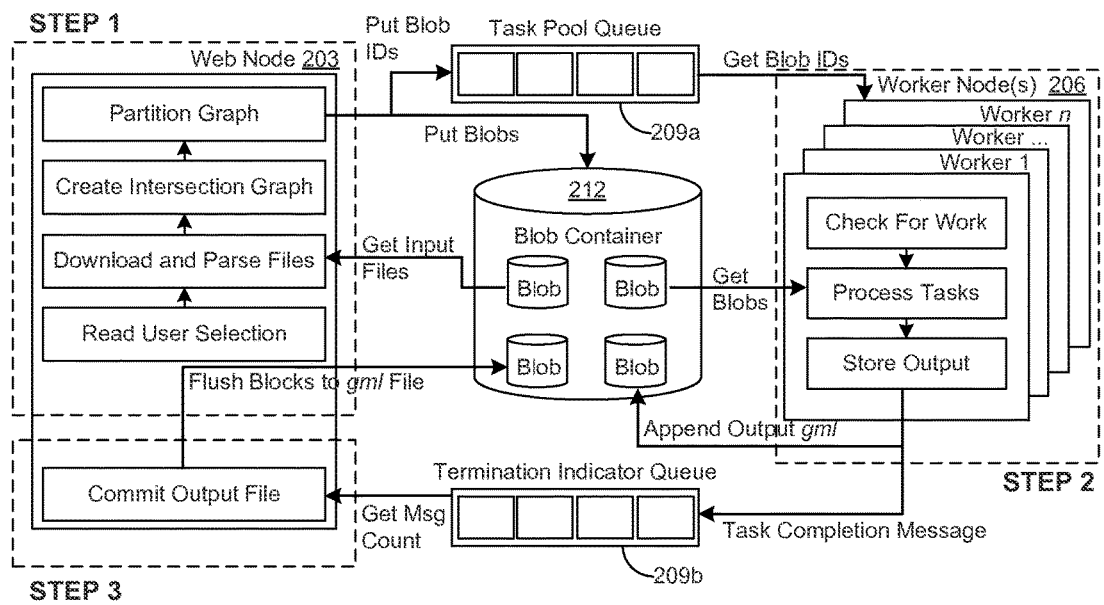
FIG. 6 is a drawing illustrating software architecture of the Crayons algorithm utilizing the message passing interface of FIG. 2 according to various embodiments of the present disclosure.

FIG. 6 is a drawing illustrating software architecture of the Crayons algorithm utilizing the cloud-based message passing interface 215 of FIG. 2 according to various embodiments of the present disclosure. Crayons can be a cloud-based application for map overlay processing over vector-based (polygonal) GIS data. The polygon overlay process can be visualized as a process where more than one maps are overlaid on top of each other so that the resultant map can be queried for aggregated data. An example of this could be overlaying the map of a city with a map of the swath of a hurricane. The resulting map can be queried to find those rescue centers in the city that are safe.

FIG. 6 shows the architectural diagram of Crayons with a centralized load balanced version employing an extra-large virtual machine (VM) as the web node 303. End users have the option to upload their input files in GML format to the cloud computing environment 200 or to operate on existing files.

A user selects GML files to be processed along with the spatial operation to be performed on these files. First of these two selected files is treated as the base layer and the other file is treated as the overlay layer. The web node 303 can being downloading the files from cloud storage and translate (or parse) the features (polygons) from the input GML files into C# objects. Since spatial overlay operations are computationally expensive, the set of polygon pairs needing to be processed together can be pruned. In order to create this intersection graph, Crayons finds each overlay polygon that can potentially intersect with the given base polygon and only performs spatial operation on these pairs. This is achieved using the coordinates of bounding boxes generated during parsing of input files.

Intersection graph creation currently is based on sorting the polygons with (n log n) cost. Intersection graph defines one-to-many relationship between the set of base polygons and overlay polygons. To create an independent task, one polygon from base layer and all related polygons from overlay layer are merged together as a task and stored in the cloud storage as a blob. The web node 303 converts the C#'s polygon objects belonging to a task to their GML representation to be stored in the blob storage 312. In-house serialization can be preferred against C#'s serialization library to avoid excessive metadata required to convert an object to string.

Each task is given a unique identifier (ID) which is communicated to the worker nodes 306 using a message over the queue storage 309 that serves as a shared task pool among workers and thus facilitates dynamic load balancing. The queue storage 309 provided by various cloud computing platforms (e.g., Azure®) can be used to implement task based parallelism and fault tolerance.

Worker nodes 306 continuously check the shared task pool (queue) for new tasks. As this can throttle the queue storage 309, with a limit to support a maximum of 500 requests per second, a worker node 306 is permitted to sleep if there is no message in the queue storage 309 before sending a subsequent request. However, if there is a task (message) in the shared task pool (e.g., queue storage 309*a*), the worker node 306 reads the message and consequently hides it from other worker nodes 306. The worker node 306 can download a blob with an identifier include in the message and converts the content of the downloaded blob to get the original base and overlay polygon objects back by deserializing the message. The worker node 306 can then perform a spatial overlay operation by passing a pair of base polygons and one overlay polygon at a time to a graphics processing cluster (GPC) library for sequential processing.

The GPC library returns the resultant feature as a C# polygon object that is converted to its equivalent GML representation and appended as a block to the resultant blob stored in the cloud storage. An API (e.g., PutBlock) is used to achieve parallel writing to an output blob in the blob storage 312. This API can facilitate the creation of a blob by appending blocks to it in parallel and if the sequence of the features is not critical this API can significantly improve the performance.

Additionally, each worker node 306 can put a message on the termination indicator queue 209*b* to indicate successful processing of the task. The web node 303 can keep checking the number of messages in termination indicator queue to update the user interface with the current progress of the operation. When all of the tasks have been processed the number of messages in the termination indicator queue 209*b* will match the number of base polygons. When this happens web node 303 commits the resultant blob and flushes it as a persistent blob in the blob storage. The resultant blob becomes available for downloading or further processing and a user interface is also updated with a uniform resource identifier (URI) or uniform resource locator (URL) of a resultant blob. To commit a blob created using blocks the API PutBlockList is used. In order to use PutBlockList it is necessary to provide the list of blocks to be committed, this list is maintained at the cloud end and can be downloaded by the web role by using another API GetBlockList.

The queue storage mechanism provided by various cloud computing platforms (e.g., Azure®) can be utilized for fault tolerance during processing. For example, after a worker node 306 reads a message from the task pool queue 209a, the message disappears from the task pool queue 209a for other worker roles and is subsequently deleted by the worker node 306 after successful processing. In the event of a failure, the message does not get deleted and is reintroduced in the task pool queue 209a after a predefined amount of time.

Figure 7:
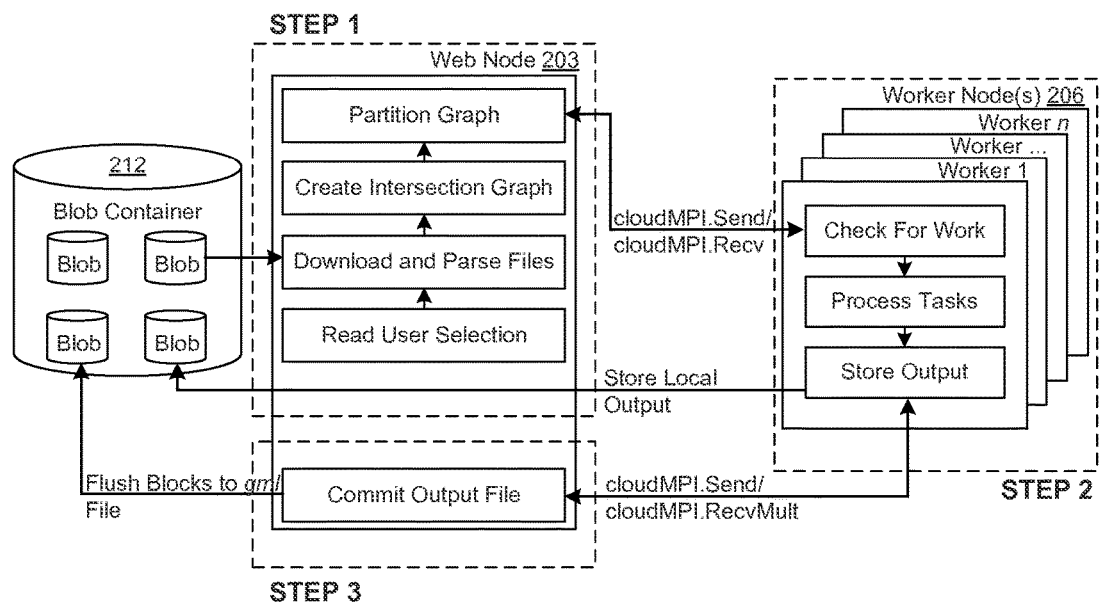
FIG. 7 is another drawing illustrating software architecture of the Crayons algorithm utilizing the message passing interface of FIG. 2 according to various embodiments of the present disclosure.

FIG. 7 is another drawing illustrating software architecture of the Crayons algorithm utilizing the cloud-based message passing interface 215 of FIG. 2 according to various embodiments of the present disclosure. Native cloud computing platform calls (e.g., Azure® calls) can be replace with calls to the cloud-based message passing interface 215 of FIG. 2. Batch message collection can be employed to increase performance over reading a single message.

Figure 8A:
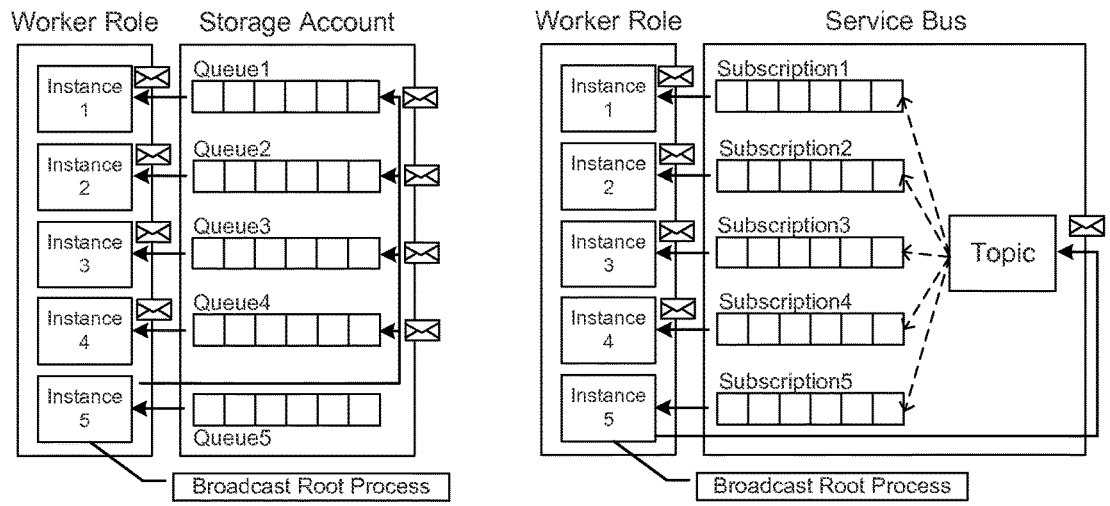
FIG. 8A is a drawing illustrating an implementation of a broadcast using a storage queue and a service bus topic according to various embodiments of the present disclosure.

FIG. 8A is a drawing illustrating an implementation of a broadcast using a storage queue and a service bus topic according to various embodiments of the present disclosure. In a broadcast operation, a root node (e.g., a web node 303) sends a message to all other nodes (e.g., worker nodes 306) in a communicator. The cloud message processing interface can be configured to support at least three implementations of data broadcasting methods, for example, by (a) using a combination of Azure® queue storage 309 and blob storage 312; (b) using a combination of service bus topic and Azure® blob storage; and (c) a hypercube-based broadcasting algorithm using Azure® queue storage 309 and blob storage 312. The first approach uses the point-to-point send and receive operations to implement the broadcast operation following the scheme shown in FIG. 8A. The root node uses the send routine inside a loop to broadcast a message to all other nodes in the communicator. Subsequently, other nodes in the communicator obtain the message using the receive routine. In the second approach, a service bus topic is used to broadcast a message between the communicator instances. All instances get subscribed to this topic inside the "init" routine. When a message is sent to a topic by the root instance, it is then made available to each instance in the communicator to be received. As the size of the message passes the maximum message size (e.g., 64 KB for storage queue and 256 KB for service bus topic), the blob storage 312 is used in both methods to communicate the broadcast data and the queue storage 309 and messages indicate the blob identifier of the data stored in the blob storage 312.

Figure 8B:
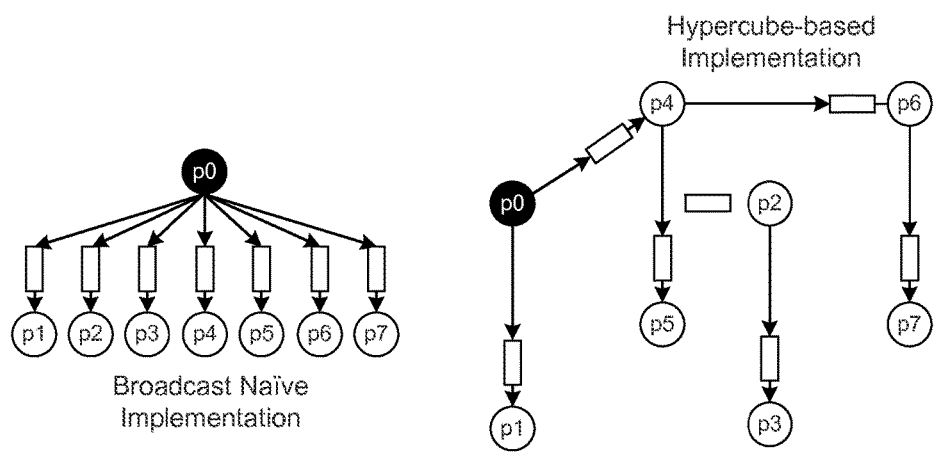
FIG. 8B is a drawing illustrating a broadcast naive implementation versus a hypercube-based implementation according to various embodiments of the present disclosure.

The third implementation is a hypercube-based broadcast algorithm that uses queue storage 309 and blob storage 312 for communication among nodes. In this communication scheme, the broadcast operation is performed in multiple steps. At each step, a number of nodes act as the message sender and neighboring nodes (e.g., determine by forming a hyper-cube arrangement) along a single direction of the hyper-cube act as the receiver nodes. In the beginning of the broadcast sequence, the root node sends the message to one of its neighbors and the chain process of broadcast gets initiated. As a result, in the nth time step, 2n nodes receive the message. In other words, for a communicator of size d, the broadcast operation is performed in log(d) time steps. FIG. 8B is a drawing illustrating a broadcast naive implementation versus a hypercube-based implementation according to various embodiments of the present disclosure.

In a scatter operation, a root node sends the segments of a message of size m to different nodes. In a gather operation, the root node receives the segments of a message of size m from different nodes and stores them based on the order of the sending nodes rank. In MPI performed in a cloud computing environment 200 for gather and scatter operations, the length of the message received from or sent to other nodes is the same for all nodes. The scatter and gather routines are implemented using the point-to-point send and receive operations. To scatter a message between nodes of a communicator, the root node extracts N segments of the data from the send buffer and sends each segment to the receive queue of the corresponding nodes so that node 1 gets the first segment, node 2 gets the second segment, etc. Subsequently, other nodes in the communicator will wait for the message from the root processor. To gather a message from other nodes of a communicator, each node (except for the root node) sends its data to the root node queue. Then, root node receives the data from the queue and stores them in a local buffer based on the rank order. The cloud-based message passing interface 215 can be configured to support two versions of the scatter method with a first version utilizing a service bus queue and the other utilizing queue storage 309 for communication. Similar to the broadcast routine, the blob storage 312 is used for the transmission of large messages.

Figure 8C:
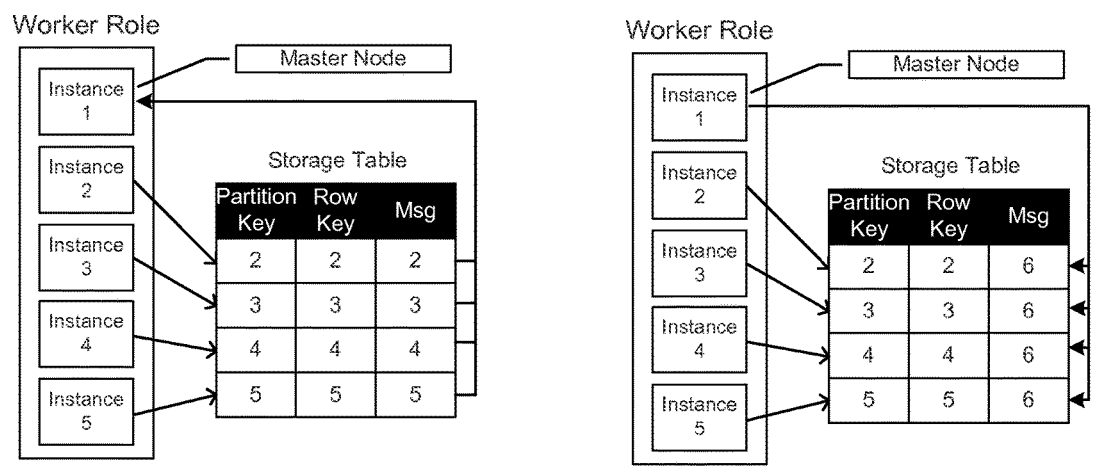
FIG. 8C is a drawing illustrating a barrier operation implementation according to various embodiments of the present disclosure.

FIG. 8C is a drawing illustrating a barrier operation implementation according to various embodiments of the present disclosure. For the scatter routine, a multi-threaded version of the scatter operation can be performed. In this implementation, threads run in parallel to send the messages to other instances' queues. Operations in MPI nodes can be synchronized by blocking nodes until all the nodes within a communicator reach a synchronization point. Table storage 315 can be employed to implement the barrier method in the cloud-based message passing interface 215. All of the instances in a communicator can insert an entity with a property equal to their identifier to a barrier table in the table storage 315 when they reach the synchronization point. The instances can then wait until the master node updates their property. A master node inside the communicator monitors the barrier queue until it receives k entity messages, where k is the number of instances in the communicator. Subsequently, the master instance updates the property of all the entities to the number of instances in the communicator. As a result, other processors become unlocked after seeing the change in their property value.

Figures 9A, 9B:
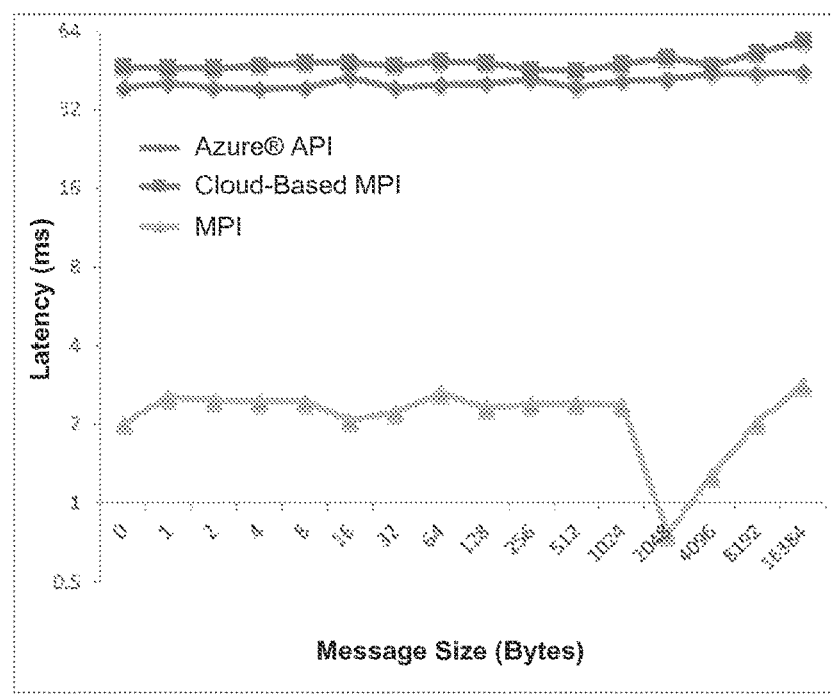
FIG. 9A is a drawing illustrating a benchmarked cloud-based MPI performance of a cloud computing environment for a small payload according to various embodiments of the present disclosure.
FIG. 9B is a drawing illustrating a benchmarked cloud-based MPI performance of a cloud computing environment for a large payload according to various embodiments of the present disclosure.
Figure 9C:
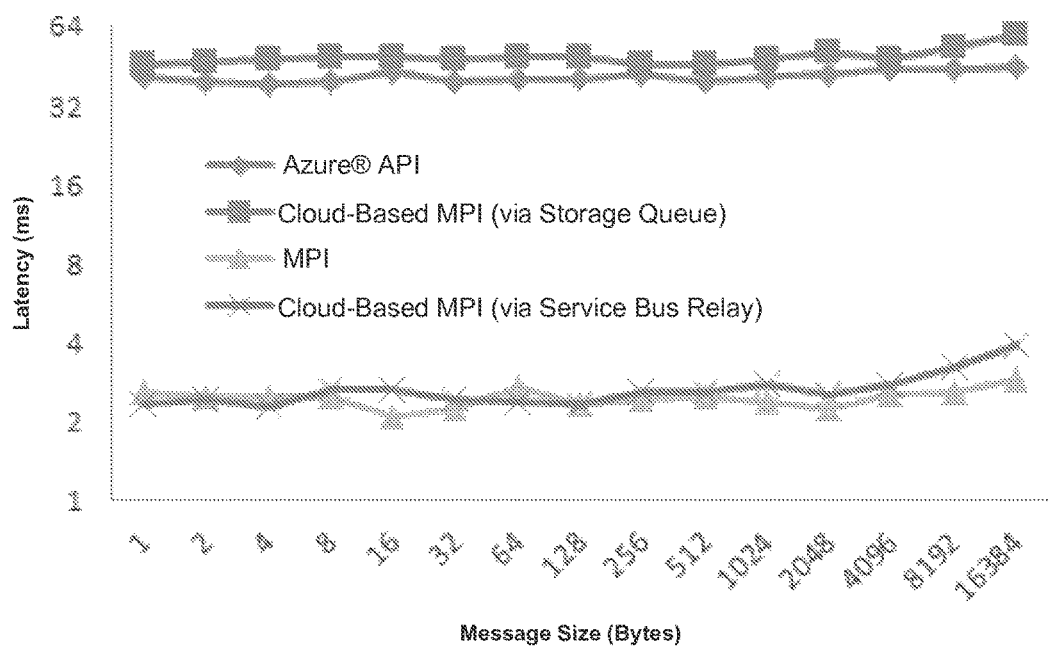
FIG. 9C is a drawing illustrating a benchmarked cloud-based MPI performance of a cloud computing environment for a small payload according to various embodiments of the present disclosure.
Figure 10A:
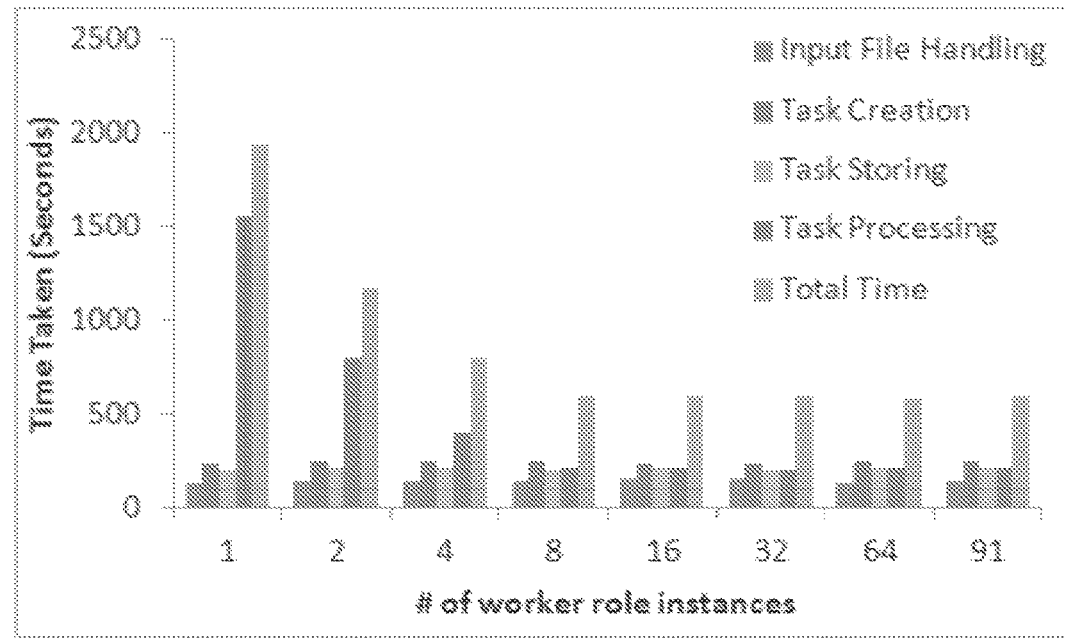
FIG. 10A is a drawing illustrating performance of the Crayons algorithm utilizing the cloud-based message passing interface of FIG. 2 according to various embodiments of the present disclosure.
Figure 10B:
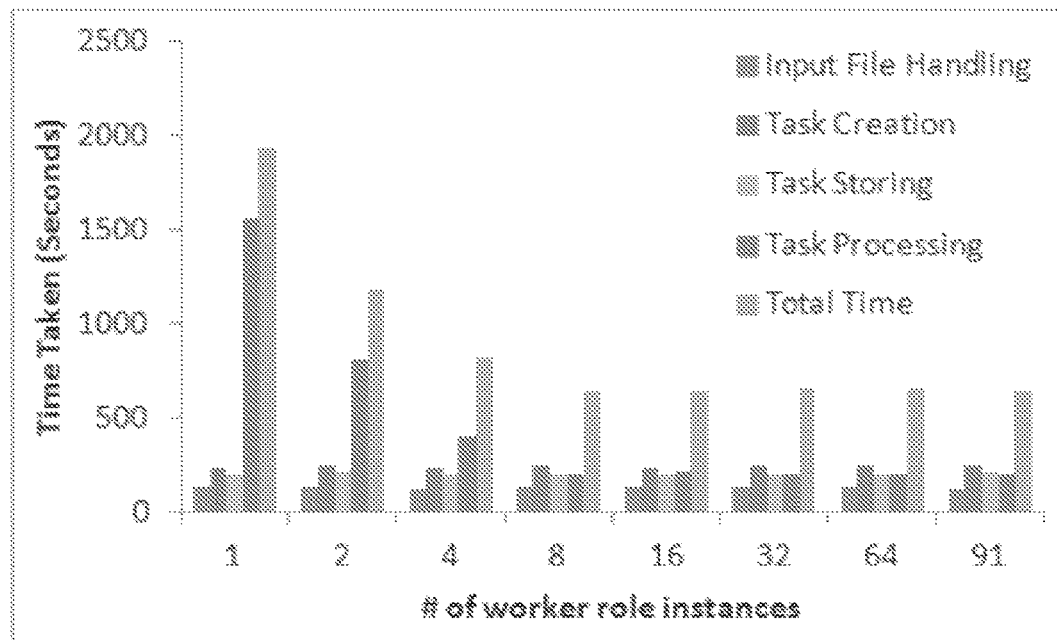
FIG. 10B is a drawing illustrating performance of the Crayons algorithm not utilizing the cloud-based message passing interface of FIG. 2 according to various embodiments of the present disclosure.

FIG. 9A is a drawing illustrating a benchmarked MPI performance of a cloud computing environment 200 for a small payload according to various embodiments of the present disclosure. FIG. 9B is a drawing illustrating a benchmarked MPI performance of a cloud computing environment 200 for a large payload according to various embodiments of the present disclosure. FIG. 9C is a drawing illustrating a benchmarked MPI performance of a cloud computing environment 200 for a small payload according to various embodiments of the present disclosure. FIG. 10A is a drawing illustrating performance of the Crayons algorithm utilizing the cloud-based message passing interface 215 of FIG. 2 according to various embodiments of the present disclosure. FIG. 10B is a drawing illustrating performance of the Crayons algorithm not utilizing the cloud-based message passing interface 215 of FIG. 2 according to various embodiments of the present disclosure.

Figure 11:
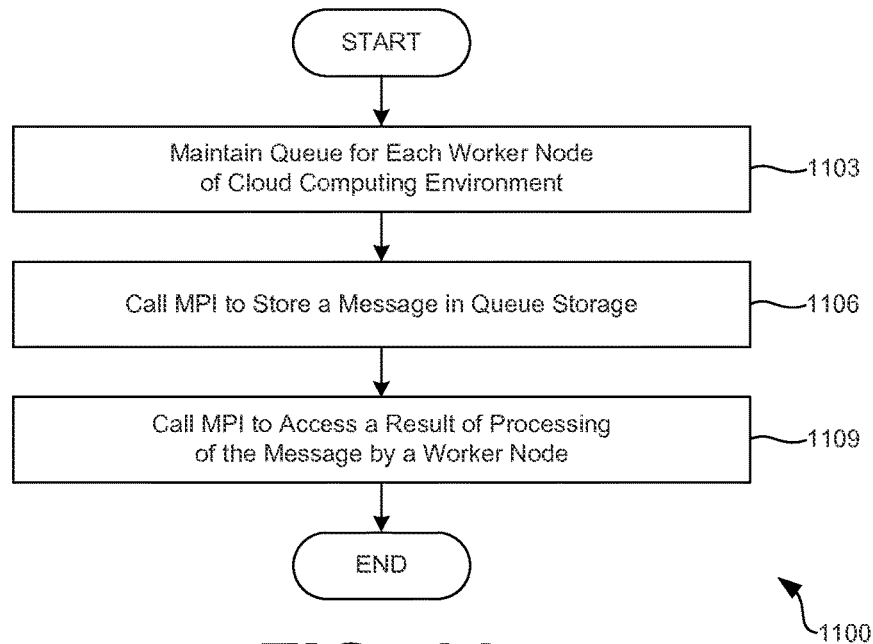
FIGS. 11-13 are flowcharts illustrating example operation of components of a cloud computing environment according to various embodiments of the present disclosure.

Turning now to FIG. 11, shown is a flowchart 1100 that provides one example of the operation of a portion of the cloud computing environment 200. As an alternative, the flowchart of FIG. 11 can be viewed as depicting an example of elements of a method implemented by a parallel computing application utilizing the cloud-based message passing interface 215 executed in the cloud computing environment 200 of FIG. 2 according to one or more embodiments. The separation or segmentation of functionality as discussed herein is presented for illustrative purposes only.

Starting with step 1103, a local queue is maintained for each worker node 306 of the cloud computing environment 200. For example, a fault tolerance feature of a cloud computing platform can be leveraged to reintroduce a message in a queue if a node has not confirmed successful processing of that message. This can be implemented for every message that involves an MPI operation. For instance, if node X sends a message to node Y then node Y reads the message, processes it, and deletes the message from its local queue. However, if node Y fails before it could delete the message, the message will reappear on the queue and hence the worker node 306 will process it when the node comes back up again.

However, we need to store the locally stored data outside the worker's memory so that the data is not lost during the event of a failure. This can be accomplished done by storing the data at a public storage such as another queue or blob storage for larger data size. A checkpoint can also be employed to avoid any dirty reads or writes if a node fails after storing the data in the public storage but before deleting the message. Such a local checkpoint can be required before and after each local communication.

As a subset of the plurality of virtual machines (VMs) can be referred to as worker nodes, the parallel computing application can initialize a queue for each of the worker nodes, such that each of the worker nodes poll a corresponding queue to access a designated message for processing.

In step 1106, the cloud-based MPI can be called to store a message requiring processing a queue storage 312 (e.g., global queue storage) accessible by one or more worker nodes 306. In other words, the cloud-based message passing interface 215 can be called by a parallel processing application to cause a first one of the plurality of virtual machines (VMs), or nodes, to store a message in a queue storage of the cloud computing environment 200, wherein a second one of the plurality of virtual machines (VMs) is configured to poll the queue storage of the cloud computing environment 200 to access the message and perform a processing of data associated with the message.

Next, in step 1109, the cloud-based MPI can be called to access a result of a processing of the message (and/or data associated with the message) that was performed by a worker node 306. In other words, the cloud-based message passing interface 215 can be called by the parallel processing application to access a result of the processing of the data from the queue storage, the result of the processing being placed in the queue storage by the second one of the plurality of virtual machines (VMs).

Data associated with the message can be included within the message if a size of the data is less than a predefined threshold (e.g., less than 64 kB). Alternatively, the data associated with the message can be stored in a blob storage of the cloud computing environment 200 if a size of the data meets or exceeds a predefined threshold (e.g., equal to or greater than 64 kB). In this embodiment, the message can comprise an identifier that identifies a location of the data in the blob storage 312.

Figure 12:
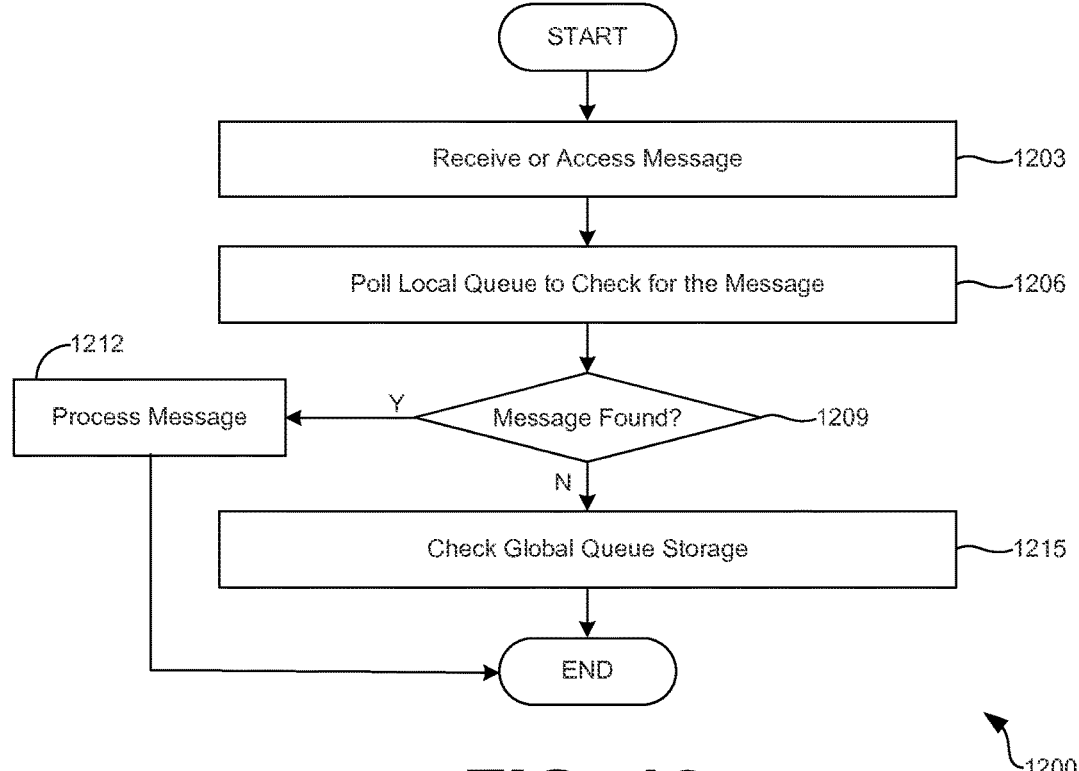

Moving on to FIG. 12, shown is a flowchart 1200 that provides one example of the operation of a portion of the cloud computing environment 200. As an alternative, the flowchart of FIG. 12 can be viewed as depicting an example of elements of a method implemented by a parallel computing application utilizing the cloud-based message passing interface 215 executed in the cloud computing environment 200 of FIG. 2 according to one or more embodiments. The separation or segmentation of functionality as discussed herein is presented for illustrative purposes only.

As noted above, data associated with the message can be included within the message if a size of the data is less than a predefined threshold (e.g., less than 64 kB). Alternatively, the data associated with the message can be stored in a blob storage of the cloud computing environment 200 if a size of the data meets or exceeds a predefined threshold (e.g., equal to or greater than 64 kB). In this embodiment, the message can comprise an identifier that identifies a location of the data in the blob storage 312.

In step 1203, a node or VM instance receives or otherwise accesses a message. For example, each of the plurality of virtual machines (VMs) can comprise a local queue, wherein each of the plurality of virtual machines are configured to poll the local queue to determine whether the message is located within the local queue (step 1206). In 1209 a determination is made whether a message is found within the local queue. In response to the message not being located within the local queue, the queue storage 312 of the cloud computing environment 200 can be polled to determine whether the message exists within the queue storage.

Figure 13:
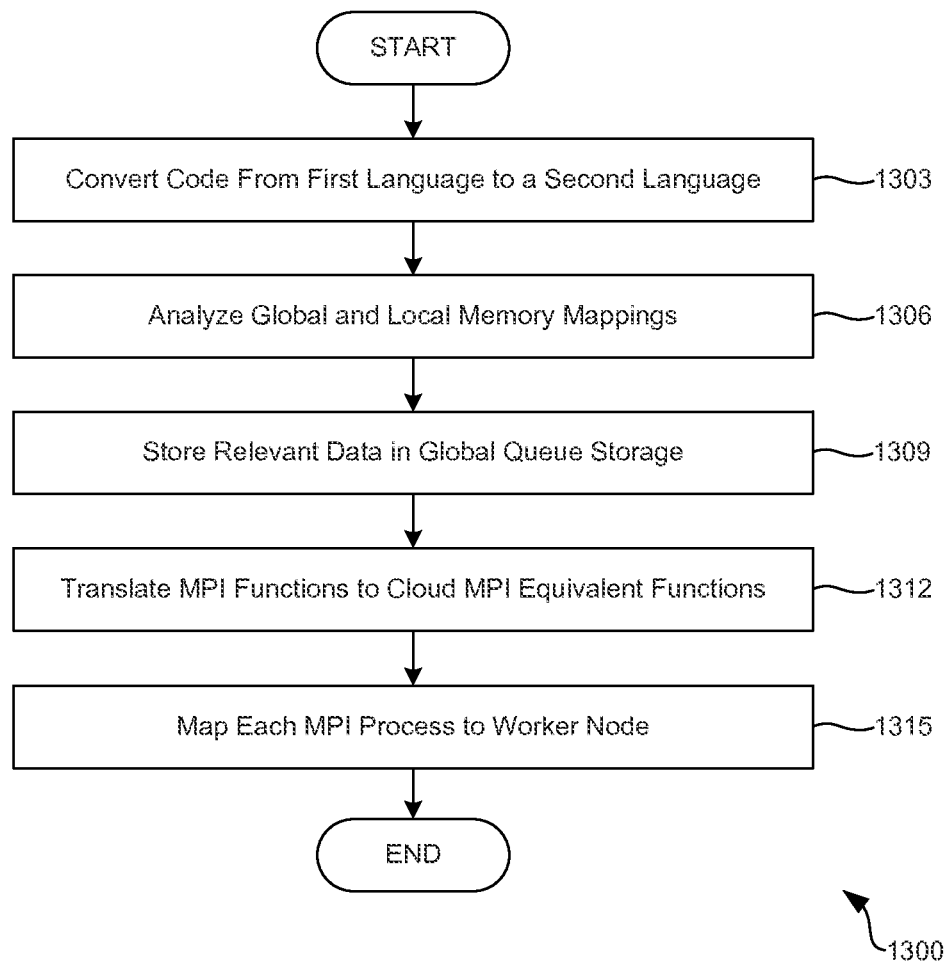

Referring next to FIG. 13, shown is a flowchart 1300 that provides one example of the operation of a portion of the cloud computing environment 200. As an alternative, the flowchart of FIG. 13 can be viewed as depicting an example of elements of a method implemented by a parallel computing application utilizing the cloud-based message passing interface 215 executed in the cloud computing environment 200 of FIG. 2 according to one or more embodiments. The separation or segmentation of functionality as discussed herein is presented for illustrative purposes only.

In various embodiments, the cloud-based MPI can be employed to run pre-written MPI code in C, C++, or other suitable programming language after utilizing a translator to convert such code into equivalent cloud-based MPI code written for one or more cloud computing platforms (e.g., Azure®) using a language of the cloud computing platform (e.g., C# for Azure®).

Starting with step 1303, a translation can be employed by converting code from a first language (e.g., the program's original language) to a second language of a particular cloud computing platform. As a non-limiting example, a program written in C and/or C++ code can be converted into C# code for execution on the Azure® platform. In step 1306, global and local memory mappings can be analyzed and relevant data can be stored in global queue storage 309 (step 1309) for access by the web node 303 and/or the worker nodes 306. Further, traditional MPI function invocations can be automatically translated to and/or replaced with equivalent cloud-based MPI primitives in step 1312. In step 1315, each MPI process can mapped to a worker node 306 in the cloud computing environment 200. In various embodiments, each worker node 306 has its own personal queue as well as a global queue shared among all worker nodes 306. Data transmission can be implemented to primarily take place over the queues. Further, data that is local to an MPI process can be stored in a queue for respective node's personal queue and data that is shared across processes can be stored in a global queue. This data can include both input and output data.

In various embodiments, a fault tolerance feature of a cloud computing platform can be leveraged to reintroduce a message in a queue if a node has not confirmed successful processing of that message. This can be implemented for every message that involves an MPI operation. For instance, if node X sends a message to node Y then node Y reads the message, processes it, and deletes the message from its local queue. However, if node Y fails before it could delete the message, the message will reappear on the queue and hence the worker node 306 will process it when the node comes back up again.

However, we need to store the locally stored data outside the worker's memory so that the data is not lost during the event of a failure. This can be accomplished done by storing the data at a public storage such as another queue or blob storage for larger data size. A checkpoint can also be employed to avoid any dirty reads or writes if a node fails after storing the data in the public storage but before deleting the message. Such a local checkpoint can be required before and after each local communication.

Figure 14:
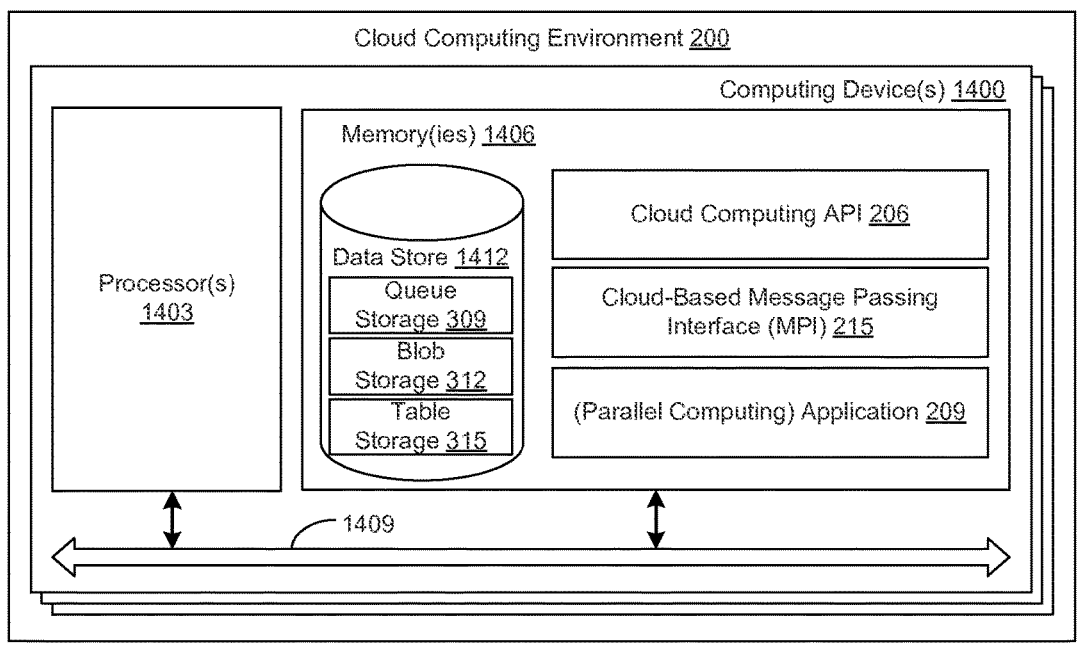
FIG. 14 is a schematic block diagram that provides one example illustration of a cloud computing environment according to various embodiments of the present disclosure.

With reference to FIG. 14, shown is a schematic block diagram of the cloud computing environment 200 according to an embodiment of the present disclosure. The cloud computing environment 200 includes one or more computing devices 1400. Each computing device 1400 includes at least one processor circuit, for example, having a processor 1403 and a memory 1406, both of which are coupled to a local interface 1409. The processor(s) 1403 may comprise, for example, a CPU, a GPU, a VPU, or any combination thereof. To this end, each computing device 1400 may comprise, for example, at least one server computer, or like device. The local interface 1409 may comprise, for example, a data bus with an accompanying address/control bus or other bus structure as can be appreciated. The cloud computing environment 200 may further comprise one or more virtual machine instances.

Stored in the memory 1406 are both data and several components that are executable by the processor 1403. In particular, stored in the memory 1406 and executable by the processor 1403 are various cloud computing applications and potentially other applications. Also stored in the memory 1406 may be a data store 1412 and other data. In addition, an operating system may be stored in the memory 1412 and executable by the processor 1403.

It is understood that there may be other applications that are stored in the memory 1406 and are executable by the processor 1403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and/or multiple processor cores and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1403, or in multiple computing devices in the same cloud computing environment 200. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system for performing high-performance send and receive operations in a cloud computing-based message passing interface (MPI) using a queue and a blob storage, the system comprising:
   a cloud computing environment comprising:
      at least one computing device;
      a plurality of virtual machines (VMs) configured for parallel execution on the at least one computing device;
      a cloud-based message passing interface; and
      a parallel computing application executable on the at least one computing device that invokes the cloud-based message passing interface of the cloud computing environment to execute operations in parallel on the plurality of virtual machines (VMs), wherein the parallel computing application is configured to:
         maintain the queue for access by each of the plurality of virtual machines (VMs) through the cloud-based message passing interface;
         in response to a size of a message being less than a predefined threshold, store the message in the queue for retrieval by the plurality of virtual machines (VMs), wherein the message is a cloud message passing interface (cMPI) message;
         in response to the size of the message exceeding the predefined threshold, call the cloud-based message passing interface to cause a first one of the plurality of virtual machines (VMs) to (i) store the message in the blob storage of the cloud computing environment and (ii) store information associated with the message in the queue;
         call the cloud-based message passing interface to direct a second one of the plurality of virtual machines (VMs) to retrieve the message from the queue or, in an instance in which the message does not exist in the queue, retrieve the message from the blob storage, wherein the second one of the plurality of virtual machines (VMs) is configured to perform a processing of data associated with the message upon retrieval; and
         call the cloud-based message passing interface to access a result of the processing of the data from the blob storage, the result of the processing being placed in the blob storage by the second one of the plurality of virtual machines (VMs).

2. The system of claim 1, wherein the parallel computing application is further configured to initialize the queue for each worker node implemented by the plurality of virtual machines (VMs), wherein each worker node is configured to poll the queue to access a designated message for processing.

3. The system of claim 1, wherein the information associated with the message stored in the queue comprises an identifier that identifies a location of the data in the blob storage.

4. The system of claim 1, wherein the cloud-based message passing interface is configured to serialize the message into binary format and convert the binary format to a byte array prior to storage of the message in the blob storage.

5. The system of claim 4, wherein the second one of the plurality of virtual machines (VMs) calls the cloud-based message passing interface to deserialize the message from the binary format prior to the processing of data associated with the message.

6. The system of claim 1, wherein the message passing interface is configured to synchronize a plurality of operations in performed by the plurality of virtual machines (VMs) by blocking a subset of the plurality of virtual machines (VMs) until all of the plurality of virtual machines (VMs) in the subset reach a synchronization point.

7. The system of claim 1, wherein the message passing interface is configured to use the blob storage to implement a broadcast naive algorithm or a hypercube-based broadcasting algorithm.

8. The system of claim 1, wherein the parallel computing application is generated by a translation application by:
   converting code of a computing application that invokes calls to a local message passing interface to code that invokes calls to the cloud-based message passing interface of the cloud computing environment;

analyzing global and local memory mappings of the computing application;

storing data in the blob storage of the cloud computing environment based on an analysis of the global and local memory mappings; and assigning each process of the cloud-based message passing interface to a node of the plurality of virtual machines.

9. The system of claim 8, wherein code of the computing application is converted by translating at least one embedded primitive of the code of the computing application that invokes a legacy message passing interface to at least one primitive that invokes the cloud-based message passing interface.

10. The system of claim 1, wherein the cloud computing environment comprises a fault tolerance mechanism that causes the message to reappear in the queue or blob storage if a node of the plurality of virtual machines (VMs) has not confirmed successful processing of data associated with the message.

11. A computer-implemented method for performing high-performance send and receive operations in a cloud computing-based message passing interface (MPI) using a queue storage and a blob storage, comprising:

maintaining, by at least one computing device, the queue storage for access by each of a plurality of virtual machines (VMs) executing in parallel in a cloud computing environment;

calling, by the at least one computing device, a cloud-based message passing interface to execute a parallel computing application by:

in response to a size of a message being less than a predefined threshold, storing the message in the queue storage for retrieval by the plurality of virtual machines (VMs), wherein the message is a cloud message passing interface (cMPI) message;

in response to the size of the message exceeding the predefined threshold, calling the cloud-based message passing interface to cause a first one of the plurality of virtual machines (VMs) to store the message in the blob storage of the cloud computing environment; and retrieve the message from the queue storage or, in an instance in which the message does not exist in the queue storage, retrieve the message from the blob storage of the cloud computing environment;

perform a processing of data associated with the message; and calling, by the at least one computing device, the cloud-based message passing interface to access a result of the processing of the data from the blob storage, the result of the processing being placed in the blob storage by a second one of the plurality of virtual machines (VMs).

12. The computer-implemented method of claim 11, wherein the parallel computing application is further configured to initialize the queue storage for each worker node implemented by the plurality of virtual machines (VMs), wherein each worker node is configured to poll the queue storage to access a designated message for processing.

13. The computer-implemented method of claim 11, wherein an identifier that identifies a location of the message in the blob storage is stored in the queue storage.

14. The computer-implemented method of claim 11, wherein the cloud-based-message passing interface is configured to serialize the message into binary format and convert the binary format to a byte array prior to storage of the message in the blob storage of the cloud computing environment.

15. The computer-implemented method of claim 14, wherein the second one of the plurality of virtual machines (VMs) calls the cloud-based message passing interface to deserialize the message from the binary format prior to the processing of the data associated with the message.

16. The computer-implemented method of claim 11, wherein the cloud-based message passing interface is configured to synchronize a plurality of operations in performed by the plurality of virtual machines (VMs) by blocking a subset of the plurality of virtual machines (VMs) until all of the plurality of virtual machines (VMs) in the subset reach a synchronization point.

17. The computer-implemented method of claim 11, wherein the message passing interface is configured to use the blob storage to implement a broadcast naive algorithm or a hypercube-based broadcasting algorithm.

18. The computer-implemented method of claim 11, wherein the parallel computing application is generated by a translation application by:

converting code of a computing application that invokes calls to a local message passing interface to code that invokes calls to the cloud-based message passing interface;

analyzing global and local memory mappings of the computing application;

storing data in the blob storage of the cloud computing environment based on an analysis of the global and local memory mappings; and assigning each process of the cloud-based message passing interface to a node of the plurality of virtual machines.

19. The computer-implemented method of claim 18, wherein code of the computing application is converted by translating at least one embedded primitive of the code of the computing application that invokes a legacy message passing interface to at least one primitive that invokes the cloud-based message passing interface.

20. The computer-implemented method of claim 11, wherein the cloud computing environment comprises a fault tolerance mechanism that causes the message to reappear in the queue storage or the blob storage if a node of the plurality of virtual machines (VMs) has not confirmed successful processing of the data associated with the message.

* * * * *